United States Patent
Yamagata

[19]

[11] Patent Number: 6,064,773
[45] Date of Patent: *May 16, 2000

[54] IMAGE PROCESSING SYSTEM FOR PROCESSING A MULTI-TONE-LEVEL IMAGE

[75] Inventor: Hideaki Yamagata, Yokohama, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/829,946

[22] Filed: Apr. 1, 1997

[30] Foreign Application Priority Data

Apr. 2, 1996 [JP] Japan .................................. 8-104638

[51] Int. Cl.$^7$ ...................................................... G06K 9/36
[52] U.S. Cl. ......................... 382/237; 382/172; 382/270; 382/254; 258/462; 258/464
[58] Field of Search ....................................... 382/270, 176, 382/254, 237, 172, 271, 275, 266; 358/538, 433, 466, 455–460, 537, 462, 429, 452, 448; 341/56; 345/147

[56] References Cited

U.S. PATENT DOCUMENTS

| | | | |
|---|---|---|---|
| 5,097,520 | 3/1992 | Bessho et al. | 382/172 |
| 5,148,495 | 9/1992 | Imao et al. | 382/176 |
| 5,280,367 | 1/1994 | Zuniga | 358/462 |
| 5,351,313 | 9/1994 | Bessho et al. | 382/172 |
| 5,379,130 | 1/1995 | Wang et al. | 358/462 |
| 5,623,558 | 4/1997 | Billawala et al. | 382/254 |
| 5,694,228 | 12/1997 | Pearis et al. | 358/538 |
| 5,710,840 | 1/1998 | Hideshima et al. | 382/266 |

FOREIGN PATENT DOCUMENTS

| | | |
|---|---|---|
| 5-189610 | 7/1993 | Japan . |
| 5-197838 | 8/1993 | Japan . |
| 6-318251 | 11/1994 | Japan . |

OTHER PUBLICATIONS

Nina Billawala, et al., "Image Continuation", IEEE, Jul. 1993, pp. 53–57.

Nobuyuki Otsu, "An Automatic Threshold Selection Method Based on Discriminant and Least Squares Criteria", Electrotechnical Laboratory, vol. J63–D, No. 4, 1980, pp. 349–356.

J. Kittler, et al., "Minimum Error Thresholding", 1986, pp. 41–47.

*Primary Examiner*—Leo H. Boudreau
*Assistant Examiner*—Ishrat Sherali
*Attorney, Agent, or Firm*—Oblon, Spivak, McClelland, Maier & Neustadt, P.C.

[57] ABSTRACT

A multi-tone-level image is converted into an M-tone-level image using M−1 threshold values, where M−1≧2. Middle-tone-level pixels in the M-tone-level image are treated as unknown pixels, tone levels other than the middle tone levels are given to the unknown pixels based on the states of pixels in the neighborhood of the unknown pixels, and thus produces an N-tone-level image, where M>N≧2. Two threshold values of the M−1 threshold values are used for determine the middle-tone-level pixels, the two threshold values corresponding to the lightest tone level of a first image region and the darkest tone level of a second image region respectively. The first image region has tone levels which are darker than the middle tone levels and the second image region has tone levels which are lighter than the middle tone levels.

16 Claims, 14 Drawing Sheets

FIG. 8
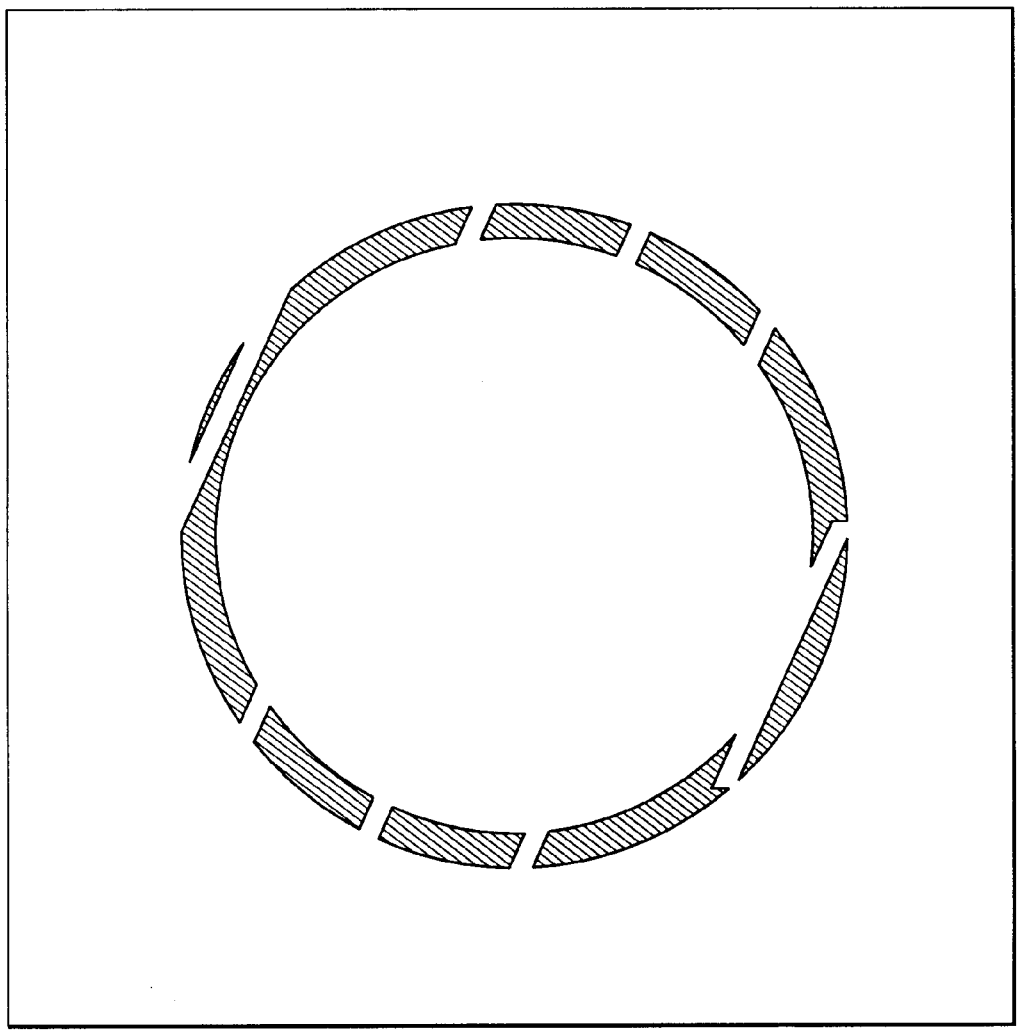
THRESHOLD VALUE $K_2$
IS SET BETWEEN
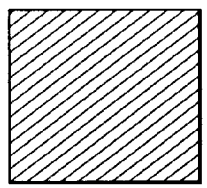 AND 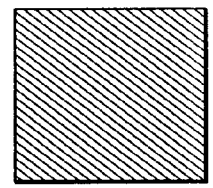

FIG. 9
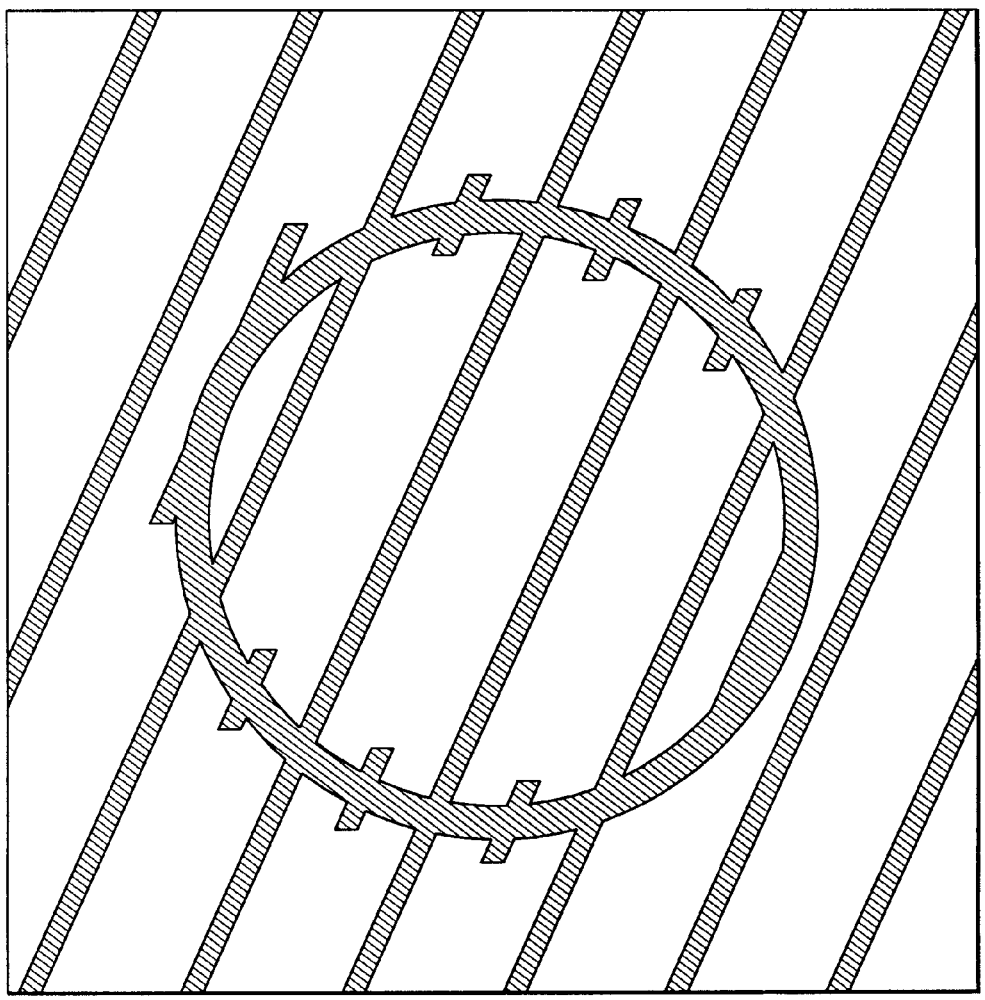
THRESHOLD VALUE $K_1$
IS SET BETWEEN
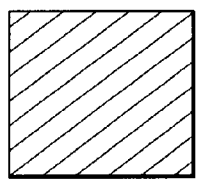 AND 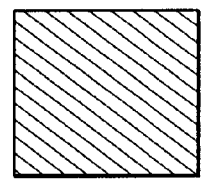

FIG. 10
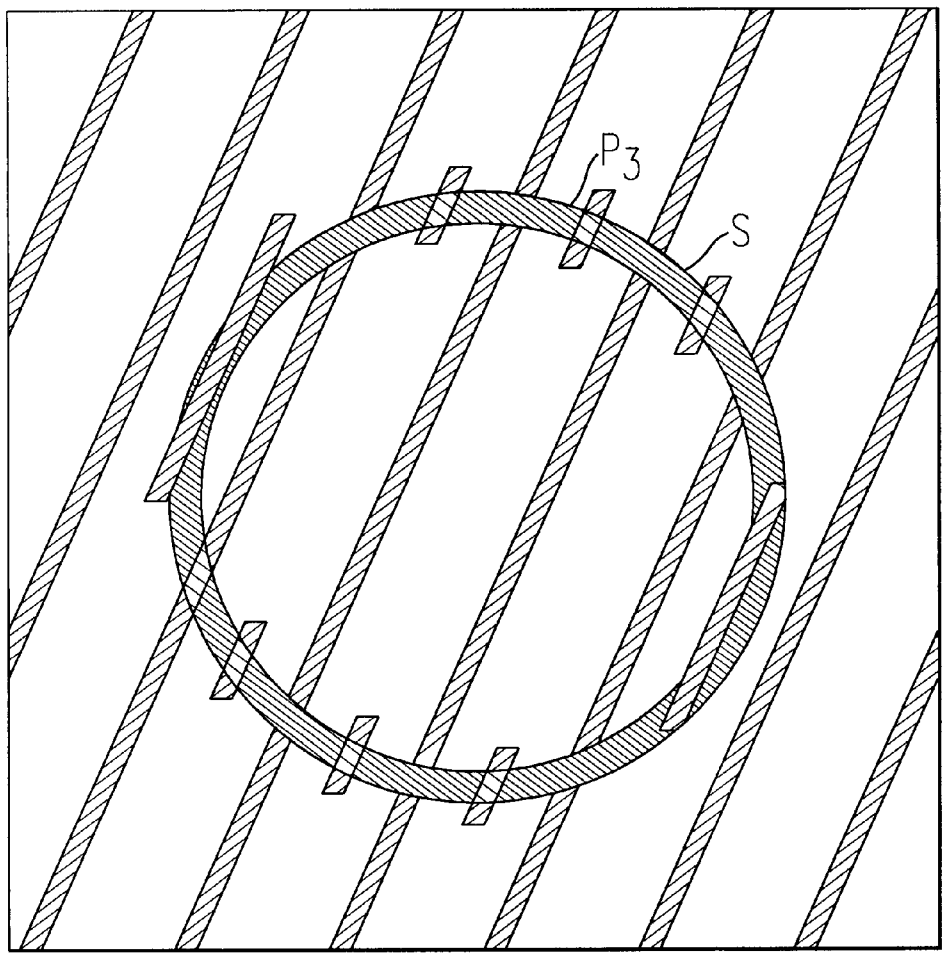
THRESHOLD VALUE $K_2$
IS SET BETWEEN
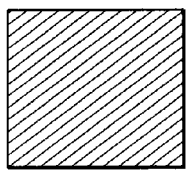 AND 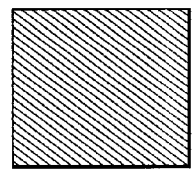
THRESHOLD VALUE $K_1$
IS SET BETWEEN
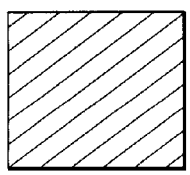 AND 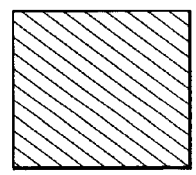

F I G. 1 2
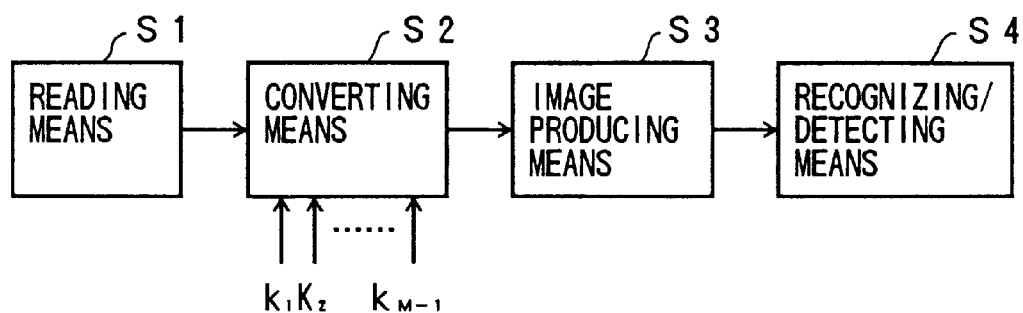

IMAGE PROCESSING SYSTEM FOR PROCESSING A MULTI-TONE-LEVEL IMAGE

BACKGROUND OF THE INVENTION

1. Field of the Invention

The present invention relates to an image processing system for performing a predetermined image processing on a multi-tone-level image.

2. Description of Related Art

Recently, as a method for converting a gray image into a binary image, methods disclosed in Japanese Laid-Open Patent Application Nos.5-189610 and 5-197838 have been proposed. In the method of Japanese Laid-Open Patent No.5-189610, the entire image is divided into small regions, and a threshold value is obtained for each region from a tone distribution of adjacent regions. An image is converted into a binary image for each region using the respective threshold value. Thus, it is intended to convert a gray image into a binary image.

In the method of Japanese Laid-Open Patent Application No.5-197838, a dynamic threshold value is calculated from image information of a small reference region, for example, a 3-by-3 pixel local region or a 5-by-5 pixel local region. The dynamic threshold value is used for converting image information of a character image into image information of a binary image. Thus, it is intended that, in the process of converting a character region image into a binary image, a high image resolution for details of characters and line charts/diagrams is maintained.

In some cases, a specific image is present in a background pattern in such a way that it is not easy to clearly recognize or detect the specific image. For example, in FIG. 7, a circle (specific image) is present in parallel oblique lines (background pattern). In such a case, the specific image is partially hidden by the background pattern. In such a case, it is required that the influence of the background pattern is removed and a binary image of the specific image is obtained, as shown in FIG. 11.

However, in the method of Japanese Laid-Open Patent Application No.5-189610, when the background pattern is very fine, each small region divided as mentioned above includes the pattern and the threshold value for each small region is determined by the pattern. Thereby, the threshold value of each region may not be useful for converting an image of the background pattern into an appropriate binary image. For example, it is not possible to remove the background pattern using such threshold values. As a result, it is not possible to extract only a specific image (to be detected) as being a binary image as shown in FIG. 11.

In the method of Japanese Laid-Open Patent Application No.5-197838, the size of a mask such as a 3-by-3 pixel region or a 5-by-5 pixel region is so small that, when a background pattern is present, influence thereof is very large and a suitable threshold value for converting an image into a binary image cannot be obtained.

Thus, in the proposed image processing methods, in a case where the background pattern is fine or the like, it is not possible to obtain an appropriate binary image. In the binary image, a specific image (to be detected) may be broken at the points of the fine pattern, as shown in FIG. 8.

SUMMARY OF THE INVENTION

An object of the present invention is to provide an image processing system by which, even in a case where a background pattern includes a fine pattern, the influence of the background is removed and a desired N-tone-level image (for example, binary image where only a specific image (to be detected) portion is filled with black pixels and the background portion is filled with white pixels) can be obtained.

An image processing system according to the present invention comprises converting means for converting a multi-tone-level image into an M-tone-level image using M−1 threshold values, where M−1≧2. The image processing system further comprise image producing means. The image producing means determines middle-tone-level pixels in the M-tone-level image as being unknown pixels. For each unknown pixel, a tone level, which is not the middle tone level, is given. The given tone level is determined based on a state of the image in the neighborhood of the unknown pixel. Thus, an N-tone-level image is produced, where M>N≧2. Thereby, in a case where a background of a specific image (to be detected) includes a fine pattern, the influence of the fine pattern is removed, and a desired N-tone-level image (for example, a binary image where a specific image portion is filled with black pixels and the background portion is filled with white pixels) can be obtained.

Other objects and further features of the present invention will become more apparent from the following detailed description when read in conjunction with the accompanying drawings.

BRIEF DESCRIPTION OF THE DRAWINGS

FIG. 8 shows a binary image obtained from the multi-tone-level image shown in FIG. 7 using a threshold value $k_2$ between the tone level of oblique lines $B_1$ (shown in FIG. 7) and the tone level of a circle S (only the pixels darker than the threshold value $k_2$ become black pixels, and the other pixels become white pixels);

FIG. 9 shows a binary image obtained from the multi-tone-level image shown in FIG. 7 using a threshold value $k_1$ between the tone level of oblique lines $B_2$ (shown in FIG. 7) and the tone level of the regions of the circle S where the oblique lines $B_2$ cross (only the pixels darker than the threshold value $k_1$ become black pixels, and the other pixels become white pixels);

FIG. 10 shows a binary image obtained from the multi-tone-level image shown in FIG. 7 using the threshold value $k_1$ between the tone level of oblique lines $B_2$ (shown in FIG.

Figure 1:
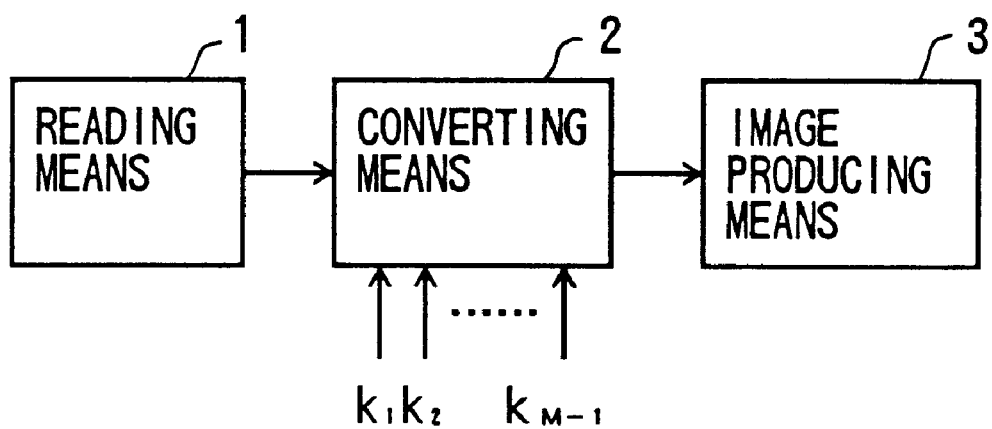
FIG. 1 shows an example of an arrangement of an image processing system according to the present invention.
Figure 2:
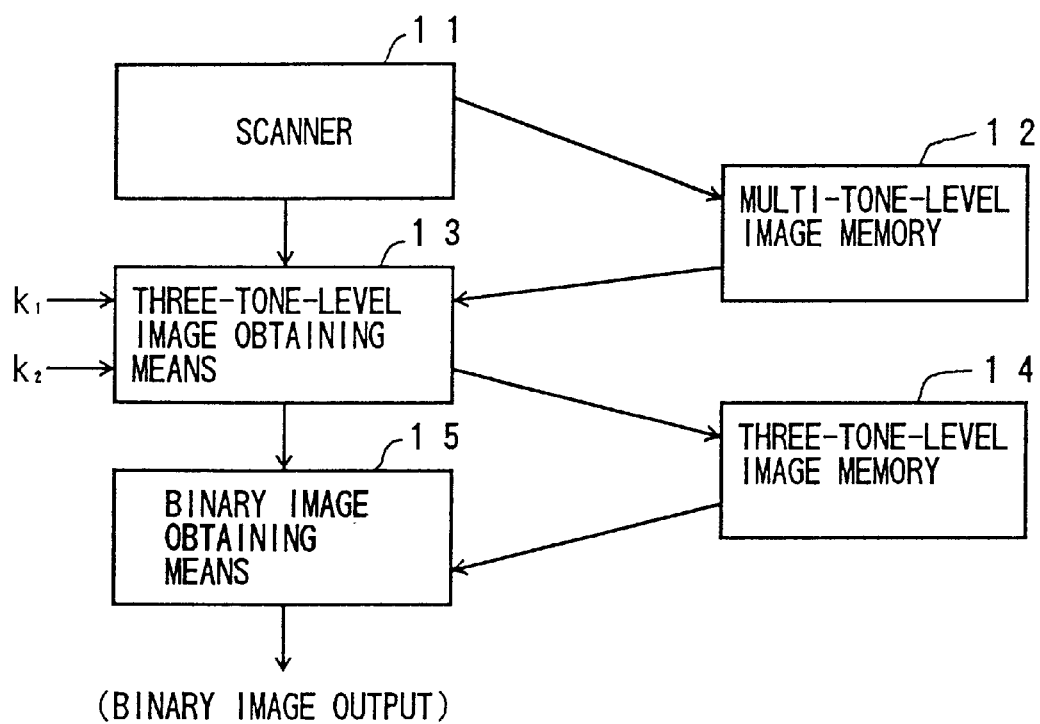
FIG. 2 shows an example of a specific arrangement of the arrangement shown in FIG. 1.
Figure 11:
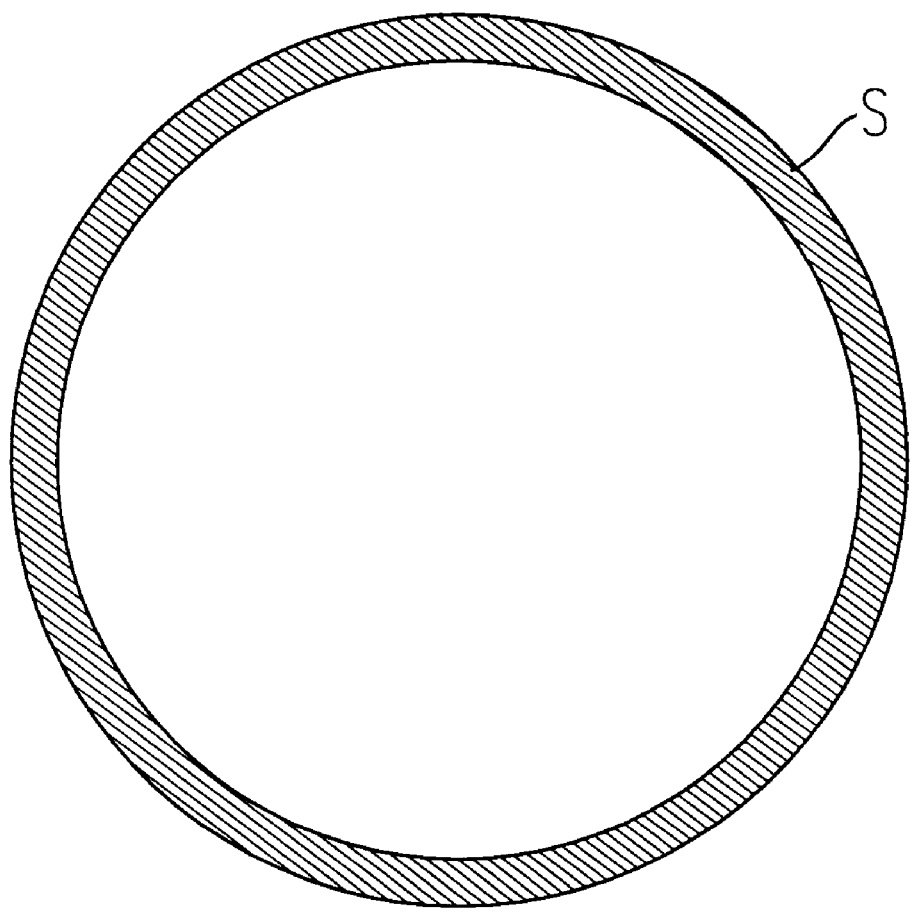
Figure 13:
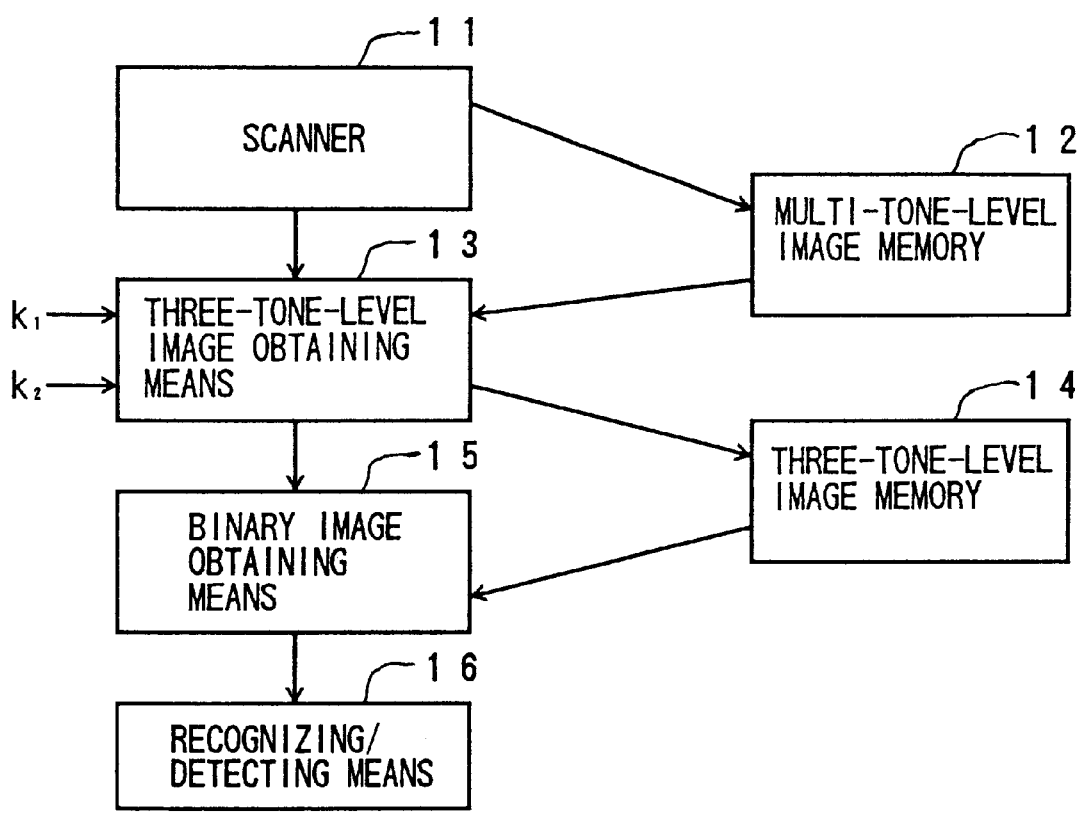
Figure 14:
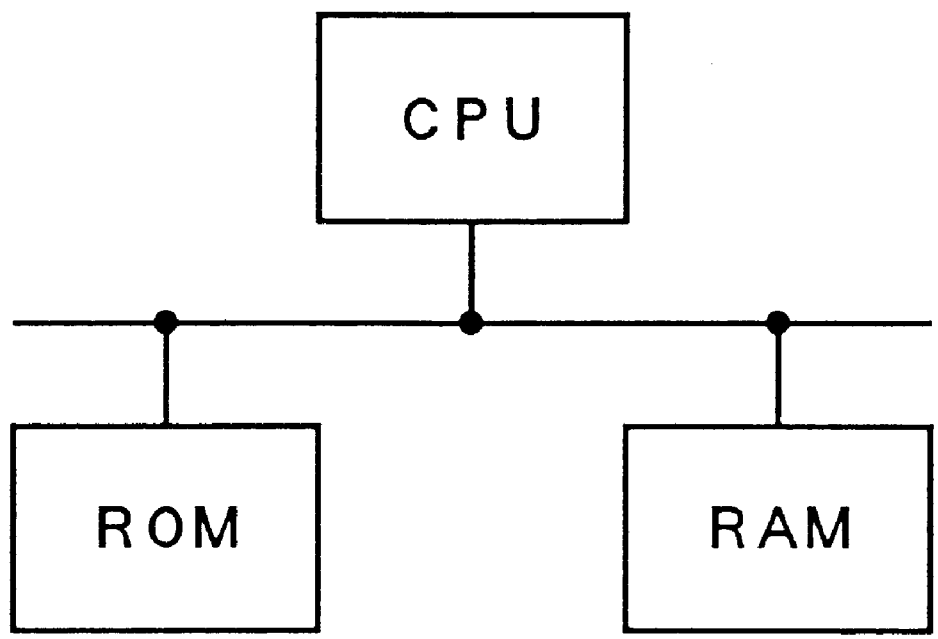

7) and the tone level of the regions of the circle S where the oblique lines $B_2$ cross and the threshold value $k_2$ between the tone level of oblique lines $B_1$ (shown in FIG. 7) and the tone level of a circle S (only the pixels darker than the threshold value $k_2$ become black pixels, only the pixel lighter than the threshold value $k_1$ become white pixels, and the other pixels become gray pixels);

FIG. 11 shows a binary image obtained from the three-tone-level image shown in FIG. 10 as a result of determining the unknown pixels (gray pixels) to be white or black pixels through an image continuation technique;

FIG. 12 shows a variant example of the arrangement of the image processing system shown in FIG. 1;

FIG. 13 shows a variant example of the arrangement of the image processing system shown in FIG. 2;

FIG. 14 shows an example of an arrangement of the present invention; and

Figure 15:
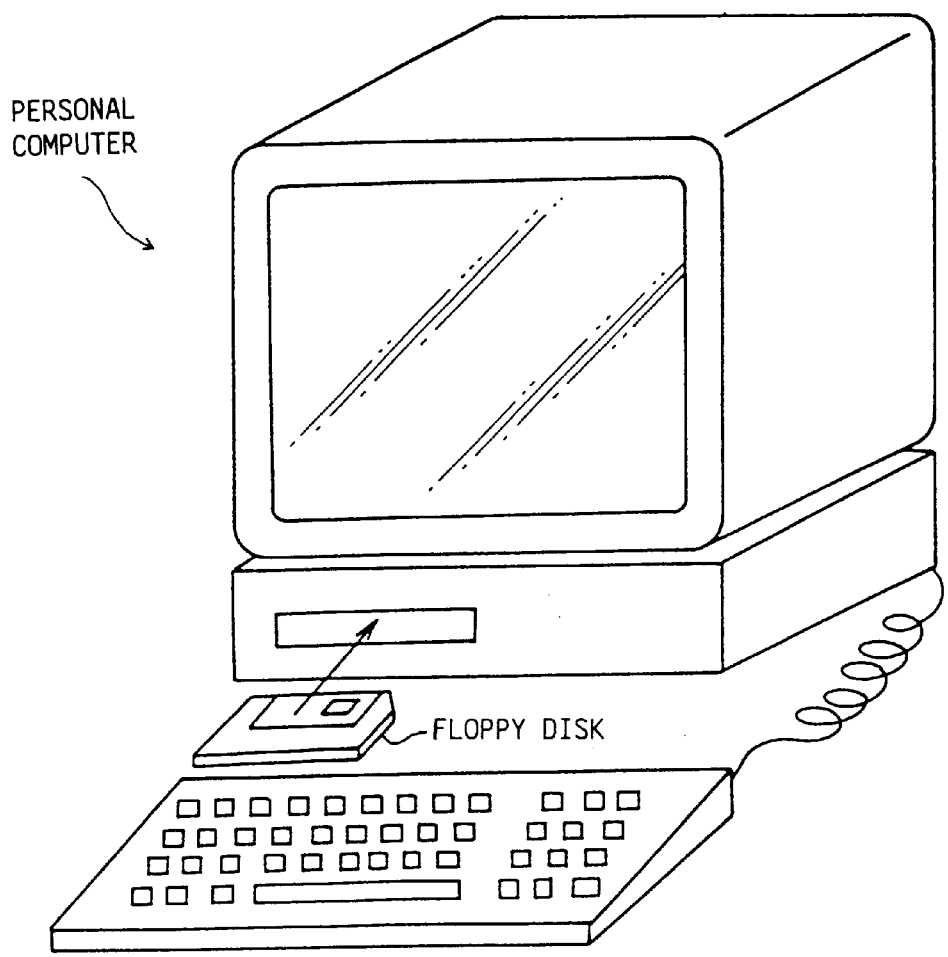

FIG. 15 shows a personal computer and a floppy disk, a software program being stored in the floppy disk and configuring the personal computer to perform the functions of the image processing system according to the present invention.

DETAILED DESCRIPTION OF THE PREFERRED EMBODIMENTS

An embodiment of the present invention will now be described with reference to the figures. FIG. 1 shows an example of an arrangement of an image processing system in the embodiment of the present invention. The image processing system includes reading means 1, converting means 2 and image producing means 3. The reading means (for example, a scanner) 1 reads a multi-tone-level image from an original image sheet or the like. The converting means 2, using M−1 threshold values, $k_1, k_2, \ldots, k_{M-1}$, converts the multi-tone-level image into an M-tone-level image, where M−1≧2. The image producing means 3 determines middle-tone-level pixels in the M-tone-level image as being unknown pixels. The image producing means 3 gives, for each unknown pixel, a tone level, which is different from the middle tone level. The image producing means 3 determines the tone level to be given to the unknown pixel based on a state of an image in the neighborhood of the unknown pixel (for example, based on the tone levels of neighborhood pixels). Thus, the image producing means 3 produces an N-tone-level image, where M>N≧2.

FIG. 2 shows an example of a more specific arrangement of the image processing system shown in FIG. 1. The image processing system includes reading means (for example, a scanner) 11, a multi-tone-level image memory 12, converting means (three-tone-level image obtaining means) 13, a three-tone-level image memory 14 and image producing means (binary image obtaining means) 15. The reading means 11 reads a multi-tone-level image from an original image sheet or the like. The multi-tone-level image memory 12 stores the read multi-tone image. The converting means 13 converts the multi-tone-level image into a three-tone-level image using first and second threshold values $k_1$ and $k_2$. The three-tone-level image consists of white pixels, black pixels and unknown pixels. In the multi-tone-level image, the pixels which have tone levels lighter than the first threshold value $k_1$ are the white pixels. The pixels which have tone levels darker than the second threshold value $k_2$ are the black pixels. The pixels which have tone levels darker than the first threshold value $k_1$ and also lighter than the second threshold value $k_2$ are the unknown pixels. The three-tone-level image memory 14 stores the three-tone-level image. The image producing means 15, based on a state of an image in the neighborhood of each unknown pixel (for example, based on the tone levels of neighborhood pixels), determines the unknown pixel to be either a black pixel or a white pixel. Thus, the image producing means 15 produces a binary image. In the example of the specific arrangement shown in FIG. 2, the M-tone-level image in the arrangement of FIG. 1 is three-tone-level image (M=3), and the N-tone-level image in the arrangement of FIG. 1 is a binary image (N=2).

As a method for converting a multi-tone-level image into an M-tone-level image (for example, three-tone-level image), a method can be used as disclosed by Nobuyuki Otsu, in Japanese publication entitled, "An Automatic Threshold Selection Method Based on Discriminant and Least Square Criteria", a publication of *Institute of Electronics and Communication Engineers of Japan*, '80/4, Vol.J63-D, No.4, pages 349–356.

According to this method, when an M-tone-level image is obtained, M−1 threshold values $k_1, k_2, \ldots, k_{M-1}$ are used, where:

$$1 \leq k_1 < k_2 < \ldots < k_{M-1} < L \qquad (1).$$

Thereby, tone levels from 0 to L are classified into M classes, class $C_1, C_2, C_3, \ldots, C_M$, as follows:

$$Cj \text{ for } Sj=[k_{j-1}+1, \ldots, k_j](j=1, 2, 3, \ldots, M) \qquad (2),$$

where $k_0=0$, $k_M=L$. An occurrence probability $\omega_j$ and an average level $\mu_j$ for each class is obtained from the following equations $$\omega_j = P_r(C_j) = \sum_{i \in S_j} p_i = \omega(k_j) - \omega(k_{j-1}),$$

$$\mu_j = \sum_{i \in S_j} iP_r(i \mid C_j) = \sum_{i \in S_j} ip_i / \omega_j$$

$$= \frac{\mu(k_j) - \mu(k_{j-1})}{\omega(k_j) - \omega(k_{j-1})},$$

where $\omega(0)=0$, $\mu(0)=0$. Further, the following equations are easily ascertained:

$$\sum_{j=1}^{M} \omega_j \mu_j = \mu_T,$$

$$\sum_{j=1}^{M} \omega_j = 1.$$

An objective function $\sigma^2_B$ is a function of the M−1 threshold values as shown in the following equation:

$$\sigma^2_B(k_1, \ldots, k_{M-1}) = \sum_{j=1}^{M} \omega_j (\mu_j - \mu_T)^2$$

$$= \sum_{j=1}^{M} \omega_j \mu_j^2 - \mu_T^2.$$

The set of optimum threshold values are obtained such that $\sigma^2_B$ is a maximum under the condition of the above-mentioned inequality (1).

The method disclosed in the above-mentioned publication can be applied to any multi-tone-level image. However, instead, an easier converting method (threshold value setting method) can be used.

In the arrangement shown in FIG. 1, in the M−1 threshold values $k_1, k_2, \ldots, k_{M-1}$, two threshold values are used for determining middle-tone-level pixels. When a first image (for example, the circle image shown in FIG. 7) has tone levels darker than the middle tone level, a second image (for example, parallel oblique line images) has tone levels lighter than the middle tone level and the darkest tone level of the first image is darker than the darkest tone level of the second image, the above-mentioned two threshold values can be set to be the darkest tone level of the second image and the lightest tone level of the first image.

Similarly, in the arrangement shown in FIG. 2, when a first image (for example, the circle image shown in FIG. 7) has tones level darker than the middle tone level, a second image (for example, parallel oblique line images) has tone levels lighter than the middle tone level and the darkest tone level of the first image is darker than the darkest tone level of the second image, the two threshold values $k_1$ and $k_2$ can be set to be the darkest tone level of the second image and the lightest tone level of the first image, respectively. Specifically, in a case where a specific image (for example, the circle image shown in FIG. 7) is present in a background pattern image (in the example, the parallel oblique pattern images) and the darkest tone level of the specific image is darker than the darkest tone level of the background pattern images, the two threshold values $k_1$ and $k_2$ can be set to be the darkest tone level of the background pattern images and the lightest tone level of the specific image, respectively.

Figure 3:
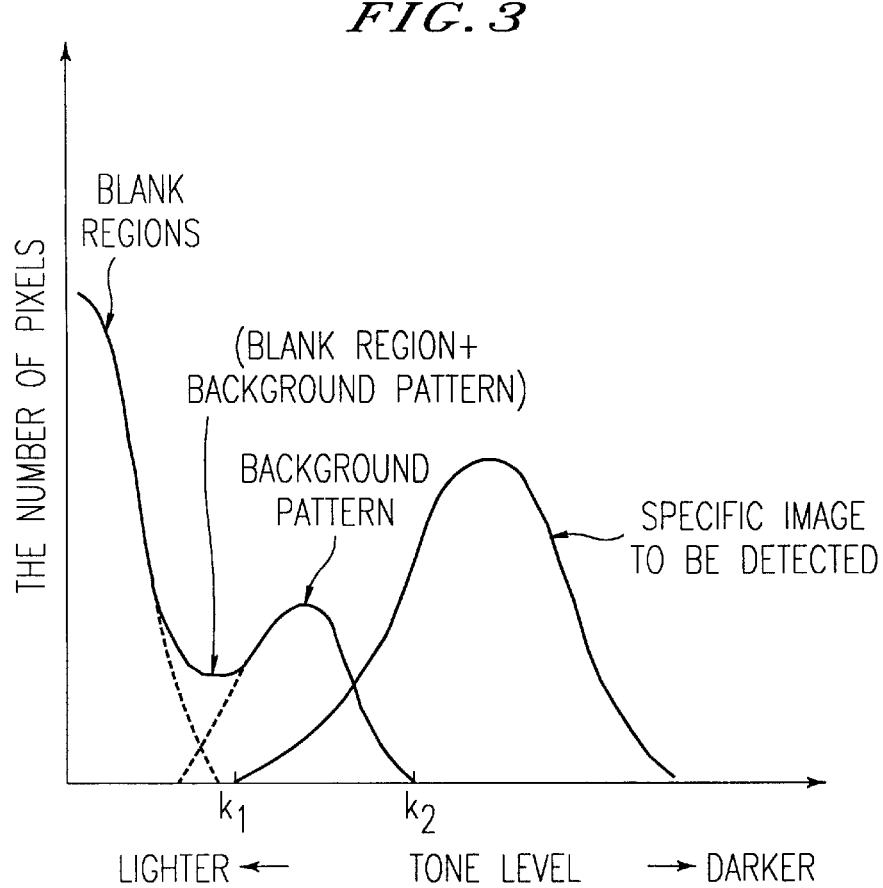
FIG. 3 shows an example of how to obtain two threshold values used for converting a multi-tone-level image into three-tone-level image in the arrangement shown in FIG. 2.

FIG. 3 shows an example of how to obtain the above-mentioned first and second threshold values $k_1$ and $k_2$ in the arrangement shown in FIG. 2. FIG. 3 shows a histogram of the number of pixels with respect to tone levels of a multi-tone-level image. In the example of FIG. 3, an original image sheet of the multi-tone-level image includes blank regions (where nothing is drawn), a background pattern (printed) portion and a specific image (printed) portion (to be detected). In this case, the two threshold values $k_1$ and $k_2$ are the darkest tone level of the background pattern and the lightest tone level of the specific image to be detected, respectively. Then, using the threshold values $k_1$ and $k_2$, the multi-tone-level image is converted into a three-tone-level image. Specifically, in the multi-tone-level image, the pixels having tone levels darker than the second threshold value $k_2$ are to be black pixels. The pixels having tone levels lighter than the first threshold value $k_1$ are to be white pixels. The pixels having tone levels darker than the first threshold value $k_1$ and also lighter than the second threshold value $k_2$ are to be unknown pixels (gray pixels).

In the arrangements of FIGS. 1 and 2, the image producing means 3 and the binary image obtaining means 15, for each unknown pixel, refers to the peripheral 3-by-3 pixel area, for example. Then, when the number of black pixels is larger than the number of white pixels in the peripheral 3-by-3 pixel area, the image producing means 3 and the binary image obtaining means 15 cause the unknown pixel to be a black pixel. In the other cases, the image producing means 3 and the binary image obtaining means 15 cause the unknown pixel to be a white pixel. By such operations, an N-tone-level image (for example, a binary image) is produced from an M-tone-level image (for example, a three-tone-level image).

Figure 4:
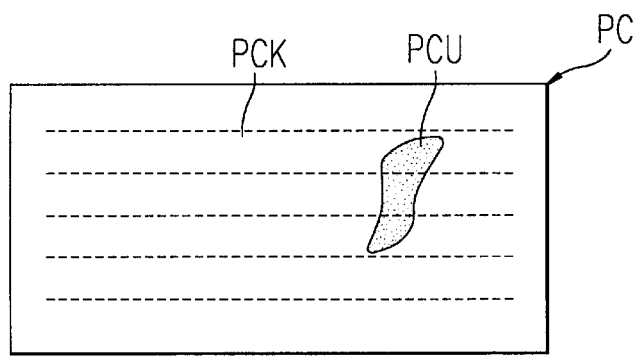
FIG. 4 shows a case where an unknown pixel region PCU consisting of unknown pixels (at a time, tone levels of which are completely unknown or are not completely unknown but are not positively known) as well as a known pixel region PCK consisting of known pixels (tone levels of which are already known) are present in an image PC.

Instead, the image producing means 3 and binary image obtaining means 15 may determine each unknown pixel to be a predetermined tone-level pixel based on pixel continuity in the neighborhood of the unknown pixel according to an image continuation technique such as that disclosed in Japanese Laid-Open Patent Application No.6-318251. Japanese Laid-Open Patent Application No.6-318251 is the corresponding application of U.S. patent application Ser. No. 08/045,954, the disclosure of which are hereby incorporated by reference. As shown in FIG. 4, an image PC includes a known pixel region PCK and unknown pixel region PCU. The tone levels of the pixels of the known pixel region PCK are known (for example, a black pixel or a white pixel). Such pixels will be referred to as 'known pixels'. The unknown pixel region PCU includes unknown pixels (the tone levels of which are completely unknown, or, if not completely unknown, are known uncertainly). According to the method of Japanese Laid-Open Patent Application No.6-318251, when a specific unknown pixel in the unknown pixel region PCU is processed, referral is made to pixels in the neighborhood of the specific unknown pixel. Using known pixels of the neighborhood pixels, the tone level of the specific unknown pixel is determined.

At this time, the number of known pixels of the neighborhood pixels of the specific unknown pixel in the unknown pixel region PCU is counted. Then, only when the number of the known pixels in the neighborhood pixels is larger than a predetermined threshold value TH, the tone level of the specific unknown pixel is determined using the known pixels of the neighborhood pixels. When the number of the known pixels in the neighborhood pixels is not larger than a predetermined threshold value TH, the tone level of the specific unknown pixel is not determined and remains as an unknown pixel. The above-mentioned processing is performed on each unknown pixel of the unknown pixel region PCU using the predetermined threshold value TH. Then, the unknown pixels, the tone levels of which were determined in the processing, are known pixels. Then, if necessary, the threshold value TH is changed gradually from a large value to a small value, and similar processing is performed on the still-unknown pixels repeatedly until the number of still-unknown pixels reaches a predetermined number ("0" or approximately "0").

In such a processing, the tone levels of unknown pixels are determined one by one, propagatively, continuously, that is, the tone level of an unknown pixel is determined based on continuity of pixels in the neighborhood of the unknown pixel. Therefore, this technique is referred to as the "image continuation" technique. This technique can be used for image repairing, for example.

Figure 5:
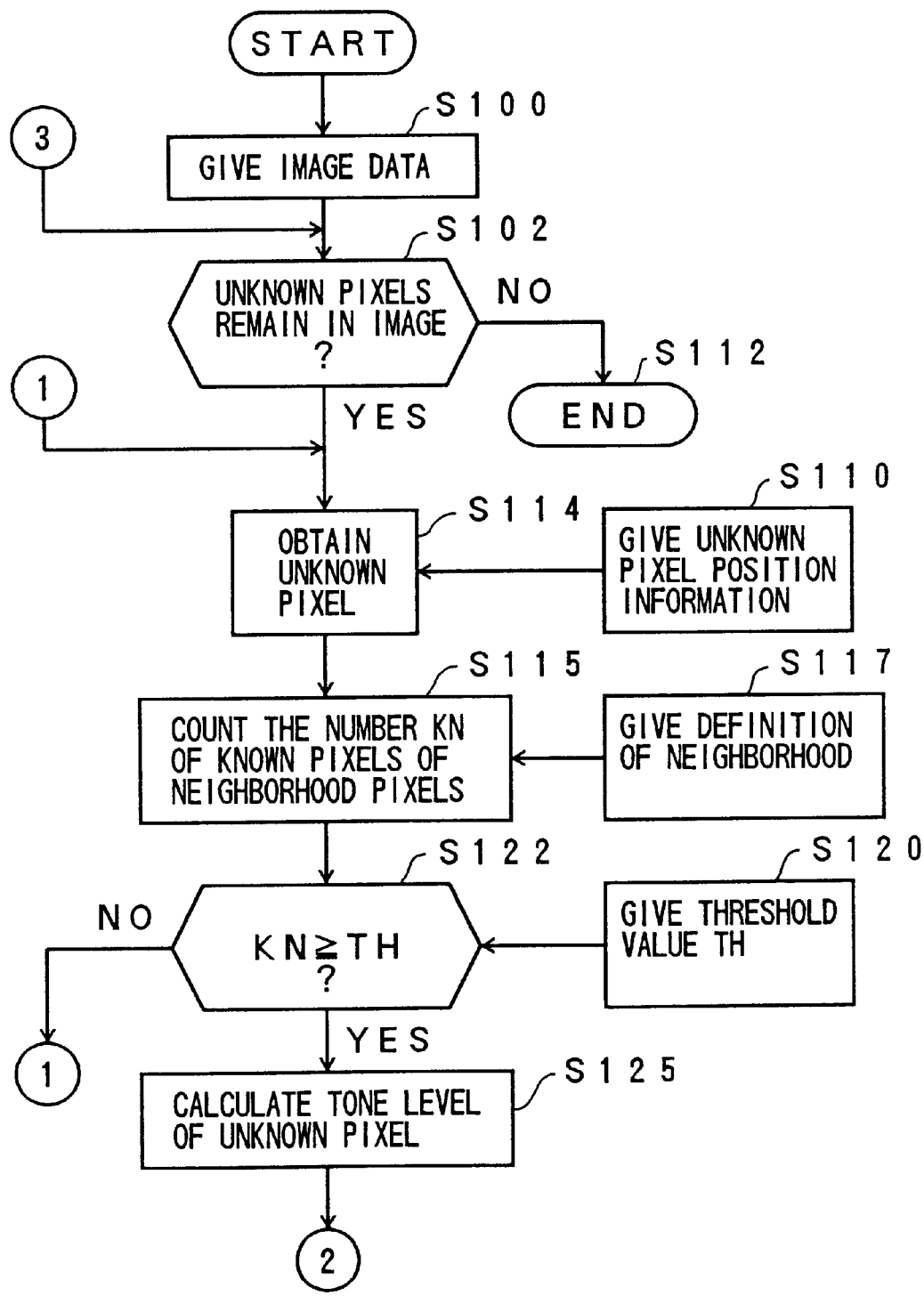
FIGS. 5 and 6 show a flowchart of an example of operations of an image continuation technique.
Figure 6:
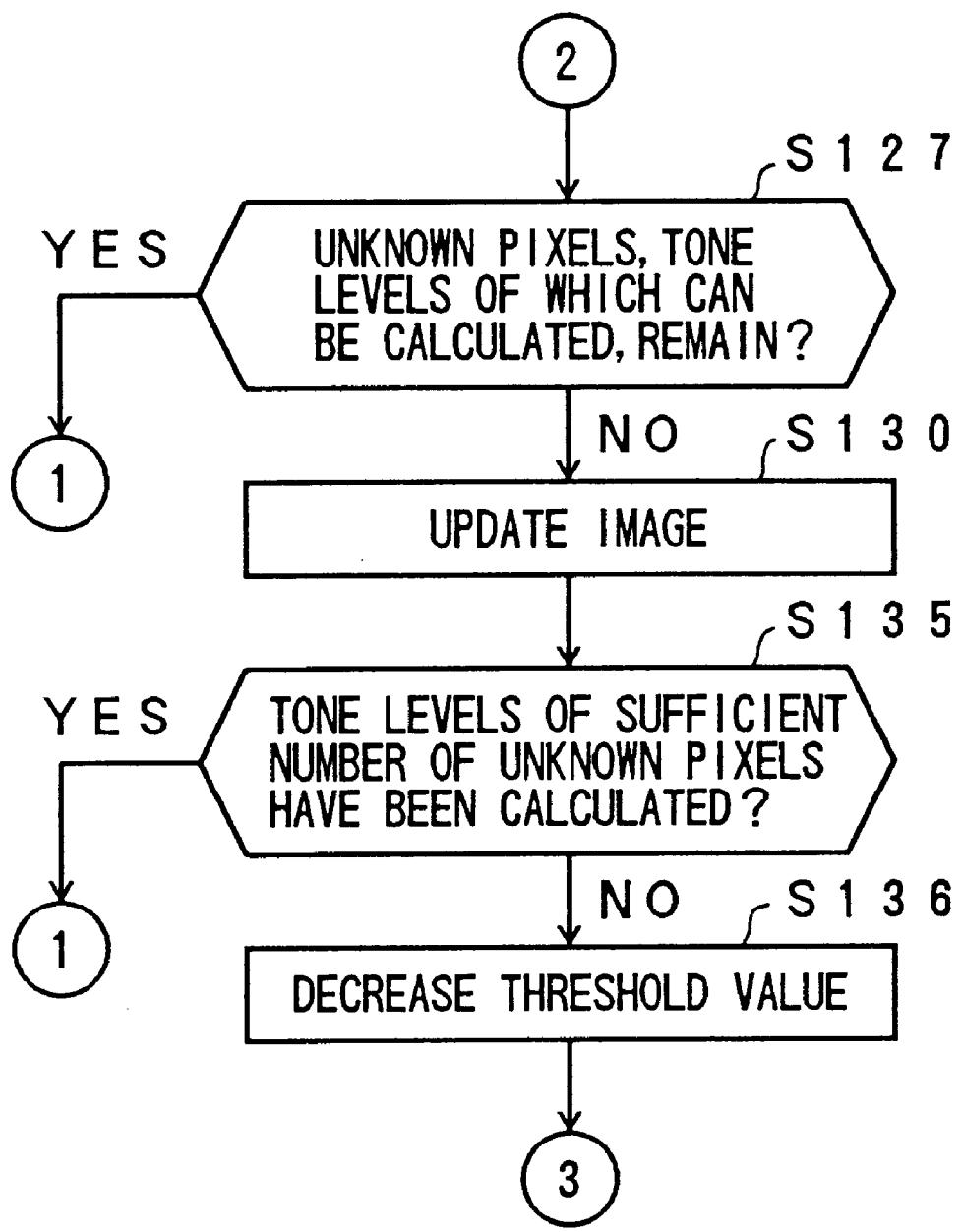

FIGS. 5, 6 shows a flowchart of the image continuation technique. However, for the sake of simplification of descriptions, as an example, processing is performed for each pixel in the known pixel region PCU, pixel by pixel. Further, it is assumed that the tone levels of the unknown pixels of the unknown pixel region PCU are completely unknown (even if the tone levels of unknown pixels are not completely unknown but are not known with certainty, such a situation is not considered). The tone level of an unknown pixel is determined based only on the tone levels of known pixels of neighborhood pixels.

As prerequisites for starting actual processing, in image data (in step S100) of an image, the unknown pixel region PCU and the known pixel region PCK other than the unknown pixel region PCU are predetermined, and the number of unknown pixels and the positions of the respective pixels (for example, the positions in a memory) are known (in step S110).

Further, neighborhood pixels for an unknown pixel should be previously defined (for example, neighborhood shape, size, and so forth) (in step S117). Further, an initial value of the threshold value TH should have been set (in step S120). The initial value of the threshold value TH may be set by specification of an operator. However, the initial value of the threshold value TH should be smaller than the number of pixels of the neighborhood. Further, a type of processing operation should have been set (the type of processing operation is an operation such as, for example, obtaining and using the average of the tone levels of the known pixels of the neighborhood pixels for determining the tone level of an unknown pixel.)

The definition of the neighborhood pixels, the initial value of the threshold value TH, and the type of operation should have been set appropriate to the type of an image to be processed (for example, whether an image is a binary image or a multi-tone-level image, whether an image is a letter image, a photographic image or a picture/drawing image), or appropriate to the type of the unknown pixel region (unknown pixel region size, shape, and so forth).

After the above-described prerequisites have been set, actual pixel processing is started. After image data of an image is given in step S100, the image data is analyzed and it is determined whether or not unknown pixels remain in the image in step S102. This operation is performed by referring to the number of unknown pixels stored in the memory and to a record of the positions of the unknown pixels. When the number of unknown pixels becomes "0" (or an allowable small number), the operation is terminated in step S112.

When a substantial number of unknown pixels remain in the image, the position of an unknown pixel is read from the memory in step S114. In step S115, the number of known pixels of the neighborhood pixels of the unknown pixel is counted.

As described above, the neighborhood pixels are previously defined in step S117. For example, eight pixels adjacent to the unknown pixels can be defined as the neighborhood pixels. These eight pixels include three pixels on the line immediately above the unknown pixel, three pixels on the line immediately below the unknown pixel, one pixel immediately left of the unknown pixel and one pixel immediately right of the unknown pixel.

However, the definition of the neighborhood can be freely set. In step S117, the definition of the neighborhood can be selected so as to optimize the system performance for particular different image types and image qualities. For example, for a type of image, a hemispherical-lens-shape pattern, a larger pattern, or another pattern can be used as the shape of the neighborhood. For a non-ordinary image, it is also possible to define the neighborhood so that pixels which are not positioned near an unknown pixel are used as the neighborhood pixels.

After counting of the number of known pixels of the neighborhood pixels is finished, the count value KN is compared with the threshold value TH in step S122.

As described above, the threshold value TH is previously set in step S120. The threshold value TH corresponds to the necessary number of known pixels of the neighborhood pixels. For example, 7 (seven pixels of the eight neighborhood pixels) is set as the threshold value TH. By using the threshold value 7 for the eight neighborhood pixels, the result of the processing is a high quality image. However, in order to perform the processing at high speed, a smaller value can be set as the threshold value TH.

When, for an unknown pixel, the number of the known pixels of the neighborhood pixels is not large enough, that is, smaller than the threshold value TH, the unknown pixel is left as the unknown pixel. Then, step 114 is performed for selecting the subsequent unknown pixel. However, in step S122, if the number of known pixels of the neighborhood pixels is equal to or larger than the threshold value TH, the tone level of the unknown pixel is calculated in step S125. An appropriate method may be used to calculate the tone level of the unknown pixel. For example, it is possible to determine the tone level of the unknown pixel as being the average of the tone levels of the known pixels of the neighborhood pixels. It is also possible to use, for this purpose, a method including a more complicated mathematical operation such as calculating weighted means or statistical correlation. It is also possible to use a larger reference region. When the tone level of the unknown pixel is calculated in step S125, it is determined whether or not unknown pixels, the tone levels of which can be calculated, remain in step S127. When unknown pixels, the tone levels of which can be calculated, remain, the subsequent unknown pixel is obtained in step S114.

After repeating such processing and there is no unknown pixel, the tone level of which can be calculated, step S130 is performed. At this stage, many unknown pixels may still remain. For each of the remaining unknown pixels, the number of the known pixels of the neighborhood pixels is smaller than the threshold value TH when all the unknown pixels are once checked in a predetermined order. However, because the unknown pixels, the tone levels of which were calculated in step S125, are now known pixels, there may be some unknown pixels, for each of which the number of the known pixels of the neighborhood pixels is equal to or larger than the threshold and the tone level of each of which can be calculated, when all the current unknown pixels are again checked.

When there is no unknown pixel, the tone level of which can be calculated, step S130 is performed. The unknown pixels, the tone levels of which were calculated, are newly known pixels, and the image is updated using the tone levels of the newly known pixels in step S130. Thus, the number of known pixels increases and the number of unknown pixels decreases.

Then, in step S135, it is determined whether or not the tone levels of the "sufficient" number of unknown pixels were calculated when all the current unknown pixels were once checked and the tone levels of the unknown pixels, for each of which the number of the known pixels of the neighborhood pixels is equal to or larger than the threshold and the tone level of each of which can be calculated, were calculated. As the "sufficient" number, the predetermined number of pixels, percentage or another pixel yardstick may be used. The step S135 is performed for effectively decreasing the number of repetitions of operations. For example, in a case where the loop of steps S114 to S127 were repeated for all the image once but, the tone levels of only one, two or a few unknown pixels were calculated, it is effective to decrease the threshold value TH in step S136. In step S135, when it is determined that the tone levels of the sufficient number of unknown pixels were calculated when all the current unknown pixels were once checked and the tone levels of the unknown pixels, for each of which the number of the known pixels of the neighborhood pixels is equal to or larger than the threshold and the tone level of each of which can be calculated, were calculated, the loop of step S114 to step S127 is repeated for all the current unknown pixels.

After the threshold value TH is decreased in S135, step S102 is performed, and subsequent repetitions of operations are performed for all the current unknown pixels. When it is determined in S102 that no unknown pixel remains, the operations are terminated in S112.

In summary, in this method, already known information and information of positions of unknown pixels obtained from an image are used. For each unknown pixel, local neighborhood pixels are considered. When sufficient information can be obtained from the neighborhood pixels, the tone level of the unknown pixel is calculated therefrom. A set of positions of unknown pixels are scanned and the same operations are performed for each position of the unknown pixel. The unknown pixels, the tone level of each of which was calculated, are now known pixels. Thereby, the number of known pixels increases. Such operations are repeated and a current set of unknown pixels are scanned repeatedly until the number of unknown pixels, for which sufficient information is obtained from the neighborhood pixels and which can be calculated therefrom, during one scan of current unknown pixels, becomes sufficiently small, for example, "0". When the number of unknown pixels, for which sufficient information is obtained from the neighborhood pixels and which can be calculated therefrom, during one scan of current unknown pixels, becomes sufficiently small, for example, "0", the threshold value TH can be decreased and similar operations are repeated using the new threshold value TH. Thereby, the number of unknown pixels is gradually decreased, and then the tone levels of all the unknown pixels are calculated. Then, the operations are terminated.

In the above-described image continuation technique, the tone level of an unknown pixel is determined and thereby the unknown pixel becomes a known pixel. The known pixel may then be used to calculate the tone level of another unknown pixel. Thus, continuity of respective pixels are maintained and thus unknown pixels are caused to be known pixels.

Operations of the image processing system shown in FIGS. 1 and 2 will now be described. For the sake of simplification of descriptions, it is assumed that the image processing system has the arrangement shown in FIG. 2. In the image processing system shown in FIG. 2, the scanner 11 is used for reading an original image as a multi-tone-level image and the read multi-tone-level image is stored in the multi-tone-level image memory 12.

Figure 7:
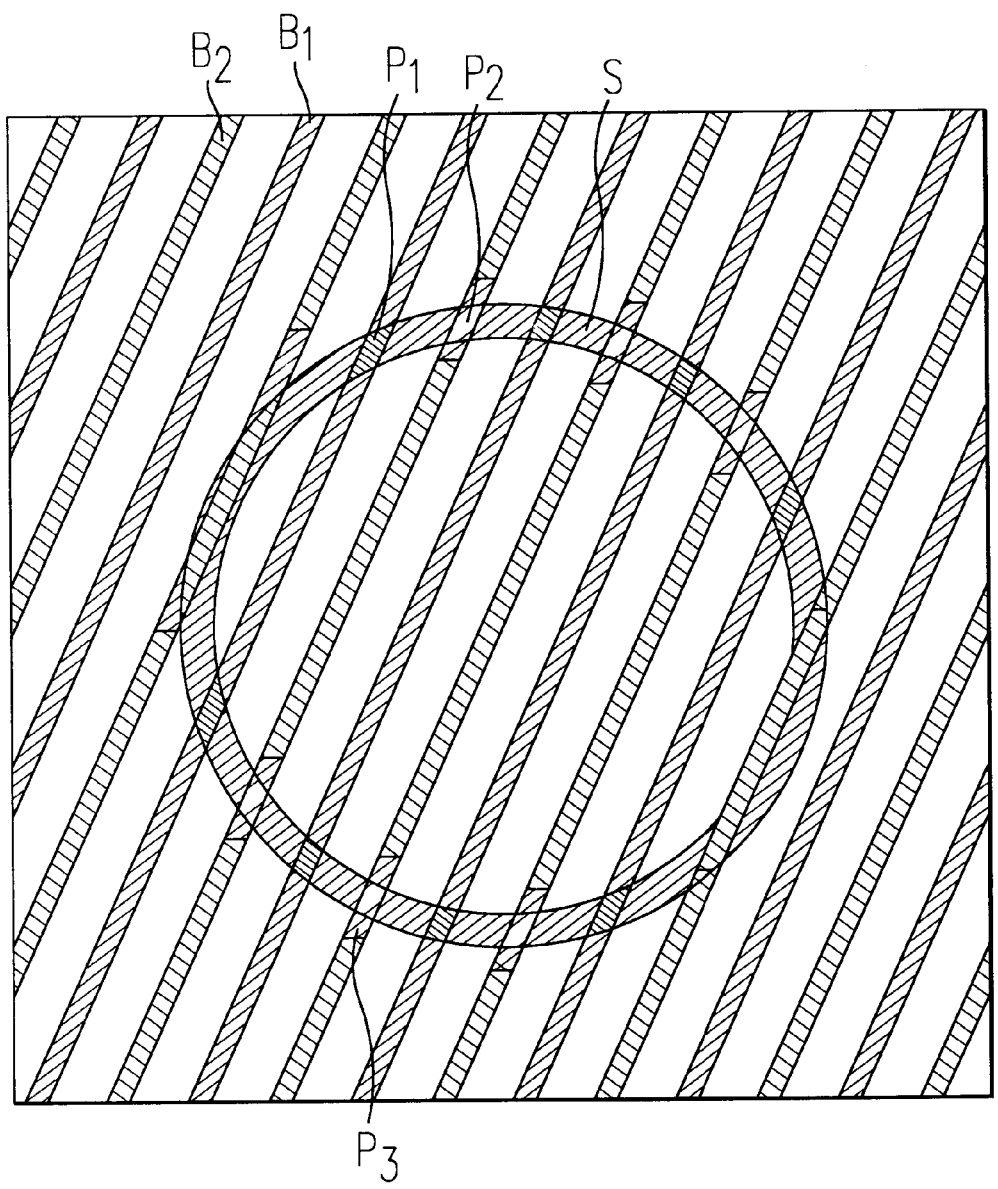
FIG. 7 shows an example of a multi-tone-level image from an original image having tone distributions of a specific image (to be detected) and background (and also blank regions) such as those shown in FIG. 3.

The multi-tone-level image stored in the multi-tone-level image memory 12 is finally converted into a binary image. However, it is more difficult to determine a threshold value for appropriately converting a multi-tone-level image into a binary image (of white pixels and black pixels) than to determine threshold values for appropriately converting a multi-tone-level image into a three-tone-level image (of white pixels, black pixels and unknown pixels). That is, it is difficult to determine a threshold value for converting a multi-tone-level image into an binary image where black pixels are allocated to an specific image (to be detected). However, it is easy to determine threshold values for converting the multi-tone-level image into a three-tone-level image where black pixels or unknown pixels are allocated to the specific image (to be detected). Further, it is difficult to determine a threshold value for converting a multi-tone-level image into a binary image where white pixels are allocated to the region other than the specific image (to be detected). However, it is easy to determine threshold values for converting the multi-tone-level image into a three-tone-level image where white pixels or unknown pixels are allocated to the region other than the specific image (to be detected). For example, the multi-tone-level image shown in FIG. 7 is processed and the specific image (to be detected) is a circle S. It is difficult or is impossible to determine a threshold value for converting the multi-tone-level image into a binary image shown in FIG. 11 where black pixels are allocated to the circle S and white pixels are allocated to the region other than the circle S.

A multi-tone-level image such as that shown in FIG. 7 is obtained, for example, as a result of drawing the circle S using color semitransparent ink on a sheet on which color parallel oblique lines $B_1$, $B_2$ have been already drawn. When drawing the circle S with semitransparent ink of some color on the parallel oblique lines $B_1$, $B_2$ of some color, due to the colors, the tone level of the circle S becomes darker (as shown in FIG. 7, a region $P_1$) or becomes lighter (as shown in FIG. 7, a region $P_2$). Further, due to the point spread function of the scanner 11, the tone level of the parallel oblique lines $B_2$ near the circle S becomes darker (as shown in FIG. 7, a region $P_3$). It is not possible to determine a threshold value for converting the multi-tone-level image shown in FIG. 7 into the binary image shown in FIG. 11. This is because the tone level of the regions $P_2$ in the circle S is lighter than the tone level of the oblique lines $B_1$. However, it is possible to determine threshold values for converting the multi-tone-level image into a three-tone-level image where black pixels or unknown (gray) pixels are allocated to the specific image (circle S), and white pixels or unknown (gray) pixels are allocated to the region other than the specific image (circle S), as shown in FIG. 10, described later.

In the arrangement of FIG. 2, the multi-tone-level image is converted into a three-tone-level image as described above.

The three-tone-level image obtaining means 13 uses two threshold values $k_1$ and $k_2$ and converts the multi-tone-level image stored in the multi-tone-level image memory 12 into a three-tone-level image of black pixels, white pixels and unknown pixels. The three-tone-level image memory 14 stores the obtained three-tone-level image.

In the processing of converting the multi-tone-level image into the three-tone-level image, the threshold values $k_1$, $k_2$ are set such that a specific image (to be detected, for example, the circle S shown in FIG. 11) will become either black pixels or unknown pixels (gray pixels in the example of FIG. 10), and the region other than the specific image will become either white pixels or unknown pixels (as shown in FIG. 10).

Then, the binary image obtaining means 15 determine whether each unknown pixel of the three-tone-level image stored in the three-tone-level image memory 14 should be a black pixel or a white pixel by referring to neighborhood black or white pixels. Thereby, the three-tone-level image such as that shown in FIG. 10 is converted into a binary image such as that shown in FIG. 11.

In the processing of converting the three-tone-level image into the binary image, for example, for each unknown pixel of the three-tone-level image, reference is made to adjacent 3-by-3 pixels (total eight pixels). Then, when the number of black pixels is larger than the number of white pixels in the eight pixels, the unknown pixel is determined to be a black pixel. In the other cases, the unknown pixel is determined to be a white pixel. Thus, the three-tone-level image is converted into the binary image.

Specifically, the above-described image continuation technique can be used to determine each unknown pixel of the three-tone-level image to be a black or white pixel using neighborhood known pixels (black or white pixels). In the image continuation technique, image continuity is maintained and each unknown pixel is determined to be a black or white pixel. Thus, the three-tone-level image is converted into the binary image.

The image processing system shown in FIGS. 1 and 2 is useful especially for processing an image in which tone distributions of a background pattern, blank regions, and a specific image (to be detected) are previously known. If an original image has tone distributions such as that shown in FIG. 3, it is not possible to determine a threshold value for converting the multi-tone-level image (original image) into a binary image where only the specific image (to be detected) becomes black pixels as shown in FIG. 11. This is because the lightest tone level of the specific image is lighter than the darkest tone level of the background pattern as shown in FIG. 3.

FIG. 7 shows one example of a multi-tone-level image which is obtained from reading through a scanner such as the scanner 11 of FIG. 2 of an original image which has tone distributions such as those as shown inn FIG. 3. As mentioned above, such a multi-tone-level image is obtained as a result of printing the circle S with color semitransparent ink on a sheet on which parallel oblique lines $B_1$, $B_2$ have been previously drawn.

FIG. 8 shows a binary image obtained from directly converting the multi-tone-level image shown in FIG. 7 into the binary image using the threshold value $k_2$. The threshold value $k_2$ is set between the tone level of the regions of the circle S where no oblique lines $B_1$, $B_2$ cross and the tone level of the regions of the oblique lines $B_1$ where the circle S does not cross. FIG. 9 shows a binary image obtained from directly converting the multi-tone-level image shown in FIG. 7 into the binary image using the threshold value $k_1$. The threshold value $k_1$ is set between the tone level of the regions ($P_2$ shown in FIG. 7) of the circle S where the oblique lines $B_2$ cross and the tone level of the regions of the oblique lines $B_2$ where the circle S does not cross.

As shown in FIG. 8, in the case where the multi-tone-level image shown in FIG. 7 is directly converted into the binary image using the above-mentioned threshold value $k_2$, the regions of the circle S where the oblique lines $B_2$ cross and the tone level becomes lighter and become white pixels. Thus, complete continuous circle S, such as that shown in FIG. 11, cannot be obtained. As shown in FIG. 9, in the case where the multi-tone-level image shown in FIG. 7 is directly converted into the binary image using the above-mentioned threshold value $k_1$, in addition to the circle S, the oblique lines $B_1$ and the regions of the oblique lines $B_2$ cross the circle S and the tone level becomes darker and becomes black pixels. Thus, extraction of only the circle S, as shown in FIG. 11, cannot be achieved.

FIG. 10 shows a three-tone-level image obtained from converting the multi-tone-level image shown in FIG. 7 using the above-mentioned threshold values $k_1$ and $k_2$. Specifically, in the multi-tone-level image, the pixels having tone levels darker than the threshold value $k_2$ become black pixels, the pixels having tone levels lighter than the threshold value $k_1$ become white pixels, and the pixels having tone levels darker than the threshold value $k_1$ and also lighter than the threshold value $k_2$ become gray pixels. FIG. 11 shows a binary image obtained from performing the above-described image continuation technique on the three-tone level value shown in FIG. 10. In the image continuation technique, the gray pixels in the three-tone-level image shown in FIG. 11 are treated as unknown pixels and black and white pixels are treated as known pixels. In the technique, the unknown pixels are determined to be white or black pixels. Only the unknown pixels $P_3$ shown in FIG. 10 present between the divided lines of the circle S are determined to be black pixels because the neighborhood pixels are the black pixels of the divided lines of the circle S. The other unknown pixels are determined to be white pixels because the neighborhood pixels are white pixels. As a result, in the binary image shown in FIG. 11, a complete continuous circle S is formed by black pixels of the blank regions. In other words, only the specific image (to be detected), that is, the circle S, is well extracted.

Thus, in the image processing system according to the present invention, a binary image where a specific image (to be detected) is well extracted can be obtained even if a background pattern or the like is drawn together with the specific image. Using the obtained binary image, the specific image can be easily and well recognized/detected.

As shown in FIGS. 12 and 13, recognizing/detecting means 4, 16 are provided subsequent to the image producing means 3 and binary image obtaining means 15, respectively. The recognizing/detecting means 4, 16 can easily recognize/detect only a specific image from N-tone-level image, where $M>N\geq 2$. In the arrangement of FIG. 13, the recognizing/detecting means 16 can easily recognize/detect only a specific image from binary image such as that shown in FIG. 11.

In the image processing system according to the present invention, when a multi-tone-level image is obtained from an original image where a specific image is drawn together with a background pattern and also the background pattern includes a fine pattern, influence of such a background pattern is removed and a desired N-tone-level image (for example, binary image where only the specific image is formed with black pixels and other regions including the background pattern are formed of white pixels) can be obtained.

Each of the image processing system shown in FIGS. 1, 2 and the image processing system shown in FIGS. 12, 13 according to the present invention can have an arrangement such as that shown in FIG. 14. In the arrangement shown in FIG. 14, a CPU performs image processing such as converting an input multi-tone-level image into an M-tone-level image using threshold values $k_1$, $k_2$, . . . , $k_{M-1}$ and producing an N-tone-level image from the M-tone-level image, where $M>N\geq 2$, using the image continuation technique. The CPU further performs recognition/detection of a specific image from the N-tone-level image when the recognizing/detecting means 4, 16 is added. A predetermined software program which configures the CPU to perform such operations is stored in a ROM shown in FIG. 14. Data of the M-tone-level image and N-tone-level image is temporarily stored in a RAM shown in FIG. 14.

It is also possible that each of the above-mentioned image processing systems can have an arrangement such as that shown in FIG. 15. A personal computer shown in the figure is configured to perform the above-described operations with a software program which is stored in a floppy disk shown in the figure.

The present invention is not limited to the above-described embodiments, and variations and modifications may be made without departing from the scope of the present invention claimed in the following claims.

What is claimed is:

1. An image processing system comprising:
    converting means for converting a multi-tone-level image into an M-tone-level image using M−1 threshold values, where M−1≧2, said M-tone-level image including white pixels, black pixels and middle-tone-level gray pixels;
    image producing means for treating said middle-tone-level gray pixels in said M-tone-level image as unknown pixels, and giving tone levels other than middle tone levels to said unknown pixels based on states of pixels in a neighborhood of said unknown pixels so as to produce an N-tone-level image, where $M>N\geq 2$; and wherein all pixels other than pixels of an image to be detected are given tone levels of white pixels, and continuity of known pixels in the image to be detected is determined from pixels in the neighborhood of the known pixel.

2. The image processing system according to claim 1, wherein said image producing means gives predetermined tone levels to said unknown pixels based on image continuity of pixels in the neighborhood of said unknown pixels.

3. The image processing system according to claim 1, wherein two threshold values of said M−1 threshold values are used to determine said middle-tone-level gray pixels, said two threshold values corresponding to a lightest tone level of a first image region and a darkest tone level of a second image region, respectively, said first image region having darker tone levels than the middle tone levels and said second image region having lighter tone levels than the middle tone levels.

4. The image processing system according to claim 1, further comprising recognizing/detecting means for recognizing/detecting a specific image region from said N-tone-level image produced by said image producing means.

5. An image processing system comprising:
converting means for converting a multi-tone-level image into a three-tone-level image which includes white pixels, black pixels and gray pixels, using first and second threshold values;
image producing means for determining tone levels of said gray pixels to be one of black and white based on states of pixels in a neighborhood of said gray pixels so as to produce a binary image; and
wherein all pixels other than pixels of an image to be detected are given tone-levels of white pixels, and continuity of known pixels in the image to be detected is determined from pixels in the neighborhood of the known pixels.

6. The image processing system according to claim 5, wherein said image producing means determines tone levels of said gray pixels to be one of white and black based on image continuity of pixels in the neighborhood of said unknown pixels.

7. The image processing system according to claim 5, wherein said two threshold values correspond to a lightest tone level of a specific image region and a darkest tone level of a background region, respectively.

8. A computer implemented image processing method comprising the steps of:
a) converting a multi-tone-level image into an M-tone-level image using M−1 threshold values, where M−1≧2, said M-tone-level image including white pixels, black pixels, and middle-tone-level gray pixels;
b) treating said middle-tone-level gray pixels in said M-tone-level image as unknown pixels, giving tone levels other than the middle tone levels to said unknown pixels based on states of pixels in a neighborhood of said unknown pixels, and producing an N-tone-level image, where M>N≧2; and
c) giving all pixels other than pixels of an image to be detected tone levels of white pixels, and determining continuity of known pixels in the image to be detected from pixels in the neighborhood of the known pixels.

9. A computer implemented image processing method comprising the steps of:
a) converting a multi-tone-level image into a three-tone-level image including white pixels, black pixels and gray pixels, using first and second threshold values; and b) determining tone levels of said gray pixels to be one of black and white based on states of pixels in a neighborhood of said gray pixels, and producing a binary image; and
c) giving all pixels other than pixels of an image to be detected tone levels of white pixels, and determining continuity of the known pixels in the image to be detected from pixels in the neighborhood of the known pixels.

10. A computer program product for image processing, comprising:
a computer usable medium having computer readable program code means embodied in said medium, said computer readable program code means comprising:
program code means for converting a multi-tone-level image into an M-tone-level image using M−1 threshold values, where M−1≧2, said M-tone-level image including white pixels, black pixels, and middle-tone-level gray pixels; and
program code means for treating said middle-tone-level gray pixels in said M-tone-level image as unknown pixels, giving tone levels other than middle tone levels to said unknown pixels based on states of pixels in a neighborhood of said unknown pixels so as to produce an N-tone-level image, where M>N≧2; and
program code means for giving all pixels other than pixels of an image to be detected tone levels of white pixels, and determining continuity of known pixels in the image to be detected from pixels in the neighborhood of the known pixels.

11. A computer program product for image processing, comprising:
a computer usable medium having computer readable program code means embodied in said medium, said computer readable program code means comprising:
program code means for converting a multi-tone-level image into a three-tone-level image including white pixels, black pixels and gray pixels, using first and second threshold values;
program code means for determining tone levels of said gray pixels to be one of black and white based on states of pixels in a neighborhood of said gray pixels, and producing a binary image; and
program code means for giving all pixels other than pixels of an image to be detected tone levels of white pixels, and determining continuity of known pixels in the image to be detected from pixels in the neighborhood of the known pixels.

12. An image processing system comprising:
converting means for converting a multi-tone-level image into an M-tone-level image using M−1 threshold values, where M−1≧2, said M-tone-level image including white pixels, black pixels and middle-tone-level gray pixels; and
image producing means for treating said middle-tone-level gray pixels in said M-tone-level image as unknown pixels, and giving tone levels other than middle tone levels to said unknown pixels based on states of pixels in a neighborhood of said unknown pixels so as to produce an N-tone-level image, where M>N≧2;
wherein two threshold values of said M−1 threshold values are used to determine said middle-tone-levels gray pixels, said two threshold values corresponding to a lightest tone level of a first image region and a darkest tone level of a second image region, respectively, said first image region having darker tone levels than the middle tone levels and said second image region having lighter tone levels than the middle tone levels.

13. The image processing system according to claim 12, wherein said image producing means gives predetermined tone levels to said unknown pixels based on image continuity of pixels in the neighborhood of said unknown pixels.

14. The image processing system according to claim 12, further comprising recognizing/detecting means for recognizing/detecting a specific image region from said N-tone-level image produced by said image producing means.

15. An image processing system comprising:

converting means for converting a multi-tone-level image into a three-tone level image which includes white pixels, black pixels and gray pixels, using first and second threshold values; and image producing means for determining tone levels of said gray pixels to be one of black and white based on states of pixels in a neighborhood of said gray pixels so as to produce a binary image;

wherein said two threshold values correspond to a lightest tone level of a specific image region and a darkest tone level of a background region, respectively.

16. The image processing system according to claim 15, wherein said image producing means determines tone levels of said gray pixels to be one of white and black based on image continuity of pixels in the neighborhood of said unknown pixels.

* * * * *